United States Patent
Murashige et al.

(10) Patent No.: US 12,233,627 B2
(45) Date of Patent: Feb. 25, 2025

(54) THIN GLASS LAMINATED BODY

(71) Applicant: NITTO DENKO CORPORATION, Ibaraki (JP)

(72) Inventors: Takeshi Murashige, Ibaraki (JP); Junichi Inagaki, Ibaraki (JP); Akiko Sugino, Ibaraki (JP); Atsushi Kishi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 17/291,373

(22) PCT Filed: Nov. 8, 2018

(86) PCT No.: PCT/JP2018/041518
§ 371 (c)(1),
(2) Date: May 5, 2021

(87) PCT Pub. No.: WO2020/095415
PCT Pub. Date: May 14, 2020

(65) Prior Publication Data
US 2022/0001652 A1     Jan. 6, 2022

(51) Int. Cl.
*B32B 3/10*      (2006.01)
*B32B 17/10*     (2006.01)
(Continued)

(52) U.S. Cl.
CPC ........ *B32B 17/10293* (2013.01); *B32B 17/10* (2013.01); *B32B 17/10018* (2013.01);
(Continued)

(58) Field of Classification Search
None
See application file for complete search history.

(56) References Cited

U.S. PATENT DOCUMENTS 6,815,070 B1   11/2004   Burkle et al.
6,853,123 B1   2/2005    Nattermann et al.
(Continued)

FOREIGN PATENT DOCUMENTS

CN   103534089 A   1/2014
CN   105722676 B   9/2018
(Continued)

OTHER PUBLICATIONS

International Search Report dated Jan. 22, 2019, issued in counterpart International Application No. PCT/JP2018/041518 (2 pages).
(Continued)

*Primary Examiner* — Christopher M Polley
(74) *Attorney, Agent, or Firm* — WHDA, LLP

(57) ABSTRACT

Provided is a thin glass laminate, which is prevented from being broken by bending of a thin glass, and which is excellent in bending durability. The thin glass laminate of the present invention includes a resin film and a thin glass arranged at least on the resin film, wherein the thin glass has a thickness of from 30 μm to 150 μm, and wherein at least part of an end surface of the thin glass is formed of an inclined surface extending downward and outward and/or a curved surface. In one embodiment, at an upper end of the thin glass, at least part of the end surface is formed of the inclined surface extending downward and outward or the curved surface.

16 Claims, 2 Drawing Sheets

(51) Int. Cl.
*G02B 1/14* (2015.01)
*G02B 5/30* (2006.01)

(52) U.S. Cl.
CPC .... *B32B 17/10155* (2013.01); *B32B 17/1099* (2013.01); *G02B 1/14* (2015.01); *B32B 2250/02* (2013.01); *B32B 2307/538* (2013.01); *B32B 2307/732* (2013.01); *G02B 5/30* (2013.01)

(56) References Cited

U.S. PATENT DOCUMENTS

| | | | |
|---|---|---|---|
| 8,722,189 | B2 | 5/2014 | Fujii |
| 9,249,049 | B2 | 2/2016 | Fujii |
| 9,446,566 | B2 | 9/2016 | Miwa et al. |
| 10,205,478 | B2 | 2/2019 | Fujii |
| 10,279,568 | B2 | 5/2019 | Miwa et al. |
| 10,396,304 | B2 | 8/2019 | Watabe et al. |
| 10,852,455 | B2 | 12/2020 | Umemoto et al. |
| 2011/0003619 | A1 | 1/2011 | Fujii |
| 2012/0202030 | A1 | 8/2012 | Kondo et al. |
| 2014/0202985 | A1 | 7/2014 | Fujii |
| 2015/0030816 | A1 | 1/2015 | Uemura et al. |
| 2015/0110991 | A1* | 4/2015 | Miwa ........... B32B 17/10706 428/137 |
| 2016/0084991 | A1* | 3/2016 | Umemoto ........... B32B 27/36 156/60 |
| 2016/0096345 | A1 | 4/2016 | Miwa et al. |
| 2016/0127002 | A1 | 5/2016 | Fujii |
| 2017/0338437 | A1 | 11/2017 | Watabe et al. |

FOREIGN PATENT DOCUMENTS

| | | |
|---|---|---|
| EP | 1826188 A1 | 8/2007 |
| EP | 2708 355 A1 | 3/2014 |
| JP | 2008-3208 A | 1/2008 |
| JP | 4122139 B2 | 7/2008 |
| JP | 2012-254624 A | 12/2012 |
| JP | 2012-254626 A | 12/2012 |
| JP | 2015-17016 A | 1/2015 |
| JP | 2017-212039 A | 11/2017 |
| JP | 2018-72837 A | 5/2018 |
| KR | 10-2012-0123375 A | 11/2012 |
| WO | 2009/078406 A1 | 6/2009 |
| WO | 2010/104039 A1 | 9/2010 |
| WO | 2011/048978 A1 | 4/2011 |
| WO | 2011/090004 A1 | 7/2011 |
| WO | 2013/154034 A1 | 10/2013 |

OTHER PUBLICATIONS

Notice of Reasons for Refusal dated Mar. 30, 2021, issued in counterpart JP Patent Application No. 2017-181498, w/English translation (6 pages).
Office Action in Chinese dated May 12, 2020, issued in counterpart TW Patent Application No. 107140828 (7 pages).
English translation of Office Action dated May 12, 2020, issued in counterpart TW Application No. 107140828. (6 pages).
Office Action dated Jan. 30, 2023, issued in counterpart KR application No. 10-2021-7013585 with English machine translation. (15 pages).
Office Action dated Aug. 4, 2022, issued in counterpart CN application No. 201880099369.9 with English machine translation. (15 pages).
Extended European search report dated May 16, 2022, issued in counterpart EP application No. 18939520.5. (7 pages).
Thomson Scientific, (2017) Week 201153, 2017 Clarivate Analytics, AN 2011-J62321, XP002806395, London, GB, Database WPI; Cited in Extended European search report dated May 16, 2022. (3 pages).

* cited by examiner

THIN GLASS LAMINATED BODY

TECHNICAL FIELD

The present invention relates to a thin glass laminate.

BACKGROUND ART

A glass laminate formed of a glass material and a resin film, such as an optical film, has hitherto been used as a constituent member of an image display apparatus, such as a substrate for a display element, a sealing material of an OLED element, or a front protection sheet. In recent years, the image display apparatus has been reduced in weight and thickness, and in addition, there has been a tendency to require more flexibility of the image display apparatus. Thus, there is a demand for use of a glass laminate made of a thinner glass material. The glass material originally has poor handleability owing to fragility thereof, and hence this problem becomes conspicuous along with the reduction in thickness. In particular, in a glass laminate having a configuration in which a glass material is arranged as an outermost layer, there is a problem in that cracks are liable to occur when the glass laminate is bent (particularly when the glass laminate is bent so as to be convex on a glass material side). The reason for this has generally been known as described below. In the case where a glass is bent, when there is a wedge-like recess, stress is concentrated in the recess. However, even when the wedge-like recess can be made small, it is theoretically impossible to obtain a perfect smooth surface.

CITATION LIST

Patent Literature

[PTL 1] JP 4122139 B2

SUMMARY OF INVENTION

Technical Problem

The present invention has been made to solve the above-mentioned problems of the related art, and an object of the present invention is to provide a thin glass laminate, which is prevented from being broken by bending of a thin glass, and which is excellent in bending durability by virtue of the shape of an end surface of the thin glass as well as the smoothness thereof.

Solution to Problem

According to one embodiment of the present invention, there is provided a thin glass laminate, including: a resin film; and a thin glass arranged at least on the resin film, wherein the thin glass has a thickness of from 30 μm to 150 μm, and wherein at least part of an end surface of the thin glass is formed of an inclined surface extending downward and outward and/or a curved surface.

In one embodiment, at an upper end of the thin glass, at least part of the end surface is formed of the inclined surface extending downward and outward or the curved surface.

In one embodiment, at least part of the end surface of the thin glass is formed of the inclined surface extending downward and outward, and an angle $\theta_1$ formed by an upper surface of the thin glass and the inclined surface extending downward and outward is more than 90° and 140° or less.

In one embodiment, the thin glass has, as the curved surface, an upward curved surface that is convex outward on at least: part of the end surface, and the upward curved surface is a curved surface in which an angle $\theta_2$ formed by a tangent plane A given at a position having a height of (height h1 of the curved surface)×¾ on the curved surface and an upper surface of the thin glass is more than 90°.

In one embodiment, the angle $\theta_2$ is more than 90° and 140° or less.

In one embodiment, the thin glass further has, as the curved surface, a downward curved surface that is convex outward on at least part of the end surface.

In one embodiment, at least part of the end surface of the thin glass is formed of the inclined surface and/or the curved surface and a vertical surface.

In one embodiment, in the thin glass, a height H1 of a portion in which the end surface is formed of the inclined surface extending downward and outward or the curved surface is 0.1% or more with respect to a thickness of the thin glass.

In one embodiment, a ratio (H1:H2) between a height H1 of a portion in which the end surface is formed of the inclined surface extending downward and outward or the curved surface and a height H2 of a portion in which the end surface is formed of the vertical surface is from 1:9 to 9.99:0.01.

In one embodiment, the end surface of the thin glass has an arithmetic average surface roughness Ra of 150 nm or less.

In one embodiment, the end surface of the thin glass has a ten-point average roughness Rz of 500 nm or less.

In one embodiment, the resin film is arranged so as to protrude from the thin glass.

In one embodiment, a step formed between the resin film and the thin glass in sectional view is 200 μm or less.

In one embodiment, the resin film is an optical film.

In one embodiment, the optical film is a polarizing plate.

In one embodiment, the resin film includes a transparent conductive layer.

In one embodiment, the thin glass and the resin film are laminated on each other via an adhesive.

According to another embodiment of the present invention, there is provided a method of manufacturing the thin glass laminate. The manufacturing method includes: laminating a thin glass and a resin film on each other to form a laminate A; cutting the laminate A to a predetermined size; and abrading an end surface of a laminate B obtained by the cutting through polishing.

Advantageous Effects of Invention

According to the present invention, at least part of the end surface is formed of the inclined surface or the curved surface, and hence the thin glass laminate, in which the thin glass is less liable to foe broken, and which is excellent in bending durability, can be provided.

DESCRIPTION OF EMBODIMENTS

A. Overall Configuration of Thin Glass Laminate

A thin glass laminate of the present invention includes a resin film and a thin glass arranged at least on the resin film. In the thin glass, at least part of an end surface of the thin glass is formed of an inclined surface extending downward and outward and/or a curved surface. The thin glass laminate of the present invention has the inclined surface extending downward and outward or the curved surface on at least part of the end surface of the thin glass, and hence, the thin glass is less liable to be broken, and the thin glass laminate is excellent in bending durability. The reason for this is conceived as described below. When the thin glass laminate is bent, a force applied to the thin glass laminate is dispersed by virtue of the inclined surface extending downward and outward or the curved surface, with the result that a local load is reduced. In addition, the above-mentioned effect becomes outstanding when the end surface includes the curved surface. Now, typical configurations of the thin glass laminate of the present invention are specifically described with reference to FIG. 1 to FIG. 6.

Figure 1:
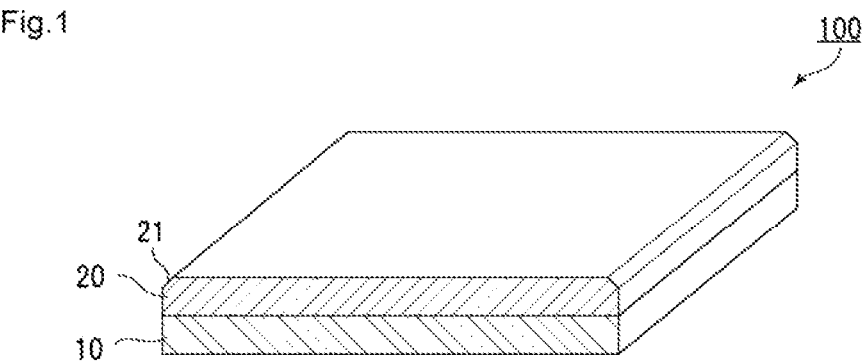
FIG. 1 is a schematic sectional perspective view of a thin glass laminate according to one embodiment of the present invention.
Figure 2:
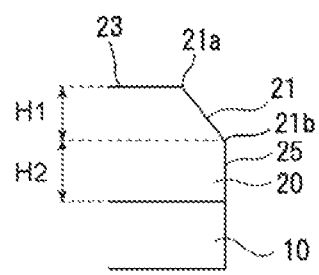
FIG. 2 is an enlarged sectional view of an end portion of the thin glass laminate according to the one embodiment of the present invention.

FIG. 1 is a schematic sectional perspective view of a thin glass laminate according to one embodiment of the present invention. FIG. 2 is an enlarged sectional view of an end portion of the thin glass laminate illustrated in FIG. 1. A thin glass laminate 100 according this embodiment includes a resin film 10 and a thin glass 20 arranged at least on one surface (upper surface) of the resin film 10. The thin glass 20 has an inclined surface 21 extending downward and outward on at least part of an end surface of the thin glass 20. In one embodiment, the thin glass 20 and the resin film 10 may be laminated on each other via any appropriate adhesive or pressure-sensitive adhesive (not shown). In addition, it is preferred that an entire surface of the resin film 10 on which the thin glass 20 is arranged be covered with the thin glass 20 (that is, it is preferred that an end portion of the resin film 10 and an end portion of the thin glass 20 be aligned with each other). As used herein, for convenience, a thin glass 20 side (upper side of the drawing sheet) of the thin glass laminate 100 is defined as an upper side, and the resin film 10 side (lower side of the drawing sheet) thereof is defined as a lower side, but this definition does not limit a method of using the thin glass laminate.

An angle $\theta_1$ formed by an upper surface 23 of the thin glass 20 and the inclined surface. 21 extending downward and outward is preferably more than 90°, more preferably more than 90° and 150° or less, more preferably more than 90° and 140° or less, still more preferably from 92° to 140°. When the angle $\theta_1$ falls within such ranges, the above-mentioned effects of the present invention become more outstanding. The thin glass may have a plurality of inclined surfaces having different inclinations and extending downward and outward. In one embodiment, the thin glass may further have an inclined surface extending downward and inward (not shown). For example, at a lower end of the thin glass 20, an inclined surface extending downward and inward may be formed on at least part of the end surface. An angle $\theta_1'$ formed by a lower surface of the thin glass and the inclined surface extending downward and inward is preferably more than 90°, more preferably more than 90° and 150° or less, still more preferably from 92° to 140°.

Figure 3:
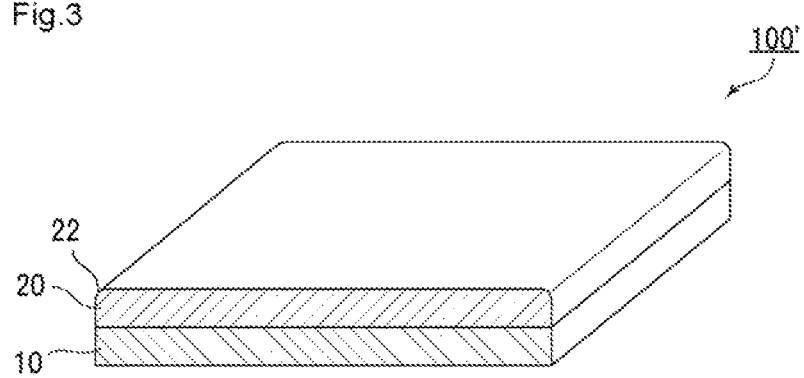
FIG. 3 is a schematic sectional perspective view of a thin glass laminate according to one embodiment of the present invention.
Figure 4:
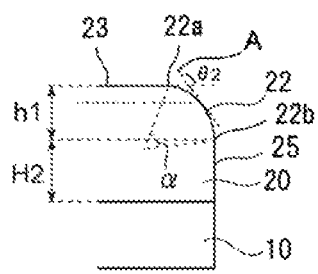
FIG. 4 is an enlarged sectional view of an end portion of the thin glass laminate according to the one embodiment of the present invention.

FIG. 3 is a schematic sectional perspective view of a thin glass laminate according to one embodiment of the present invention. FIG. 4 is an enlarged sectional view of an end portion of the thin glass laminate illustrated in FIG. 3. In a thin glass laminate 100' according to this embodiment, the thin glass 20 has a curved surface 22 on at least part of the end surface of the thin glass 20. It is preferred that the curved surface 22 be formed so as to be convex outward as in the illustrated example. In addition, the curved surface forming the end surface of the thin glass 20 may be a curved surface having a constant curvature or a set of curved surfaces defined by any appropriate curvatures (may have a plurality of curved surfaces having different curvatures). As used herein, a curved surface formed of one continuous curve having a constant curvature in sectional view is referred to as "one curved surface". Accordingly, "a set of curved surfaces defined by any appropriate curvatures" may be restated as "a set of one curved surfaces".

In one embodiment, the thin glass 20 has, on at least part of the end surface thereof, a curved surface (such curved surface is hereinafter referred to as "upward curved surface") in which an angle $\theta_2$ formed by a tangent plane A given at a position having a height of (height h1 of the curved surface 22)×¾ (position having a height of h1×¾ based on a lower end side 22b of the curved surface 22) on the curved surface 22 and the upper surface 23 of the thin glass is more than 90°. The angle $\theta_2$ is preferably more than 90° and 150° or less, more preferably more than 90° and 140° or less, still more preferably from 92° to 140°. When the angle $\theta_2$ fails within such ranges, the effects of the present invention become outstanding.

Figure 5:
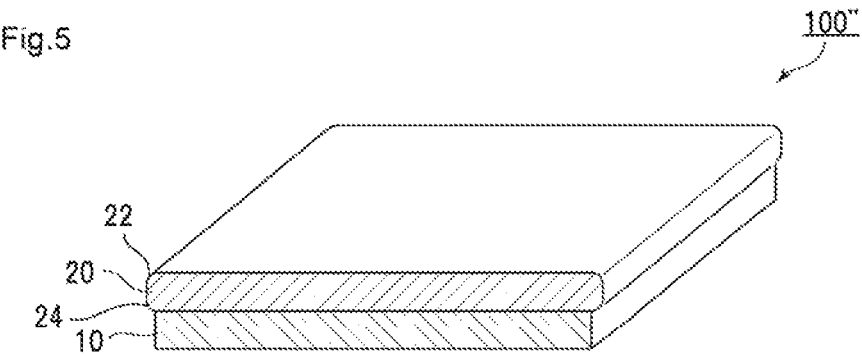
FIG. 5 is a schematic sectional perspective view of a thin glass laminate according to one embodiment of the present invention.
Figure 6:
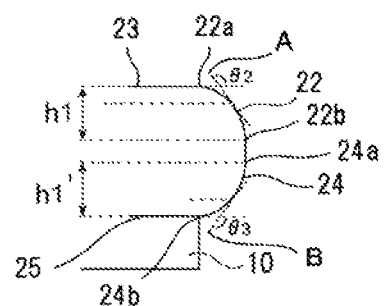
FIG. 6 is an enlarged sectional view of an end portion of the thin glass laminate according to the one embodiment of the present invention.

FIG. 5 is a schematic sectional perspective view of a thin glass laminate according to one embodiment of the present invention. FIG. 6 is an enlarged sectional view of an end portion of the thin glass laminate illustrated in FIG. 5. In a thin glass laminate 100" according to this embodiment, the thin glass 20 has an upward curved surface 22 and a downward curved surface 24 on at least part of the end surface of the thin glass 20. The downward curved surface 24 means a curved surface in which an angle $\theta_3$ formed by a tangent plane B given at a position having a height of (height h1' of the curved surface 24)×¼ (position having a height of h1'×¼ based on a lower end side 24b of the curved surface 24) on the curved surface 24 and a lower surface 25 of the thin glass is more than 90°. The angle $\theta_3$ is preferably more than 90° and 150° or less, more preferably from 92° to 140°. When the angle $\theta_3$ falls within such ranges, bending durability can be maintained. It is preferred that the downward curved surface be also convex outward.

In one embodiment, as illustrated in FIG. 1 to FIG. 6, at an upper end of the thin glass 20, at least part of the end surface is formed of the inclined surface 21 extending downward and outward or the curved surface 22 (preferably, the upward curved surface). In this embodiment, upper end sides 21a and 22a of the inclined surface 21 extending downward and outward and the curved surface 22 are each brought into contact with the upper surface 23 of the thin glass. With this configuration, a local load is reduced at the upper end of the thin glass, which is a portion that is fragile and receives a larger force at the time of bending, and a thin glass laminate that is far less liable to be broken can be obtained.

In one embodiment, as illustrated in FIG. 1 to FIG. 6, the thin glass 20 is formed of the inclined surface extending downward and outward and/or the curved surface and a vertical surface 25 on at least part of the end surface of the thin glass 20. The vertical surface 25 means a surface substantially perpendicular to the upper surface 23 of the resin film 10, and an angle formed by the vertical surface 25 and the upper surface 23 is preferably from 85° to 95°, more preferably from 85° to 90°. Those angles are acceptable because the thickness of the glass is small. In one embodiment, as illustrated in FIG. 1 and FIG. 3, the end surface is formed of the inclined surface 21 extending downward and outward or the upward curved surface 22 on the upper side of the thin glass 20, and the end surface is formed of the vertical surface 25 on the lower side of the thin glass 20. In another embodiment, as illustrated in FIG. 5, the thin glass 20 has the upward curved surface 22, the vertical surface 25, and the downward curved surface 24 in the order from above. When the end surface of the thin glass is formed so as to include the inclined surface extending downward and outward or the curved surface and the vertical surface, the effect obtained by forming the inclined surface extending downward and outward or the curved surface is exhibited without unnecessarily reducing the amount of a glass material, and a thin glass laminate more excellent in bending durability can be obtained. The resin film may be arranged so as to protrude or retract from the thin glass. In this case, a step is formed between the resin film and the thin glass in sectional view, and the step is preferably small. The step formed between the resin film and the thin glass is preferably 200 μm or less, more preferably 100 μm or less.

The shape in plan view of the thin glass (and the thin glass laminate) may be any appropriate shape. In plan view of the thin glass, an angle formed by adjacent sides may or may not be a right angle. In addition, the adjacent sides may be connected to each other through a curve. In addition, the shape in plan view of the thin glass may be defined by a straight line, a curve having any appropriate curvature, or a straight line and a curve. The thin glass may have a circular shape. This is because the bending durability of the glass is not restricted by the shape of the surface as long as the end surface of the present invention falls within the preferred ranges.

In the present invention, on the entire circumference of the thin glass, the end surface may have the inclined surface extending downward and outward or the curved surface (preferably, the upward curved surface) as described above, or on part of the circumference of the thin glass, the end surface may have the inclined surface extending downward and outward or the curved surface (referably, the upward curved surface) as described above. In addition, when the thin glass laminate has a rectangular shape, on four sides thereof, the end surface may have the inclined surface extending downward and outward or the curved surface (preferably, the upward curved surface) as described above, or on a pair of opposed sides, the end surface may have the inclined surface extending downward and outward or the curved surface (preferably, the upward curved surface) as described above. When the end surface has the inclined surface extending downward and outward or the curved surface (preferably, the upward curved surface) on the pair of opposed sides, it is preferred that the sides be to be bent.

In addition, the thin glass 20 may have both the inclined surface extending downward and outward and the curved surface on one end surface.

In the thin glass, a height $H_1$ of a portion in which the end surface is formed of the inclined surface extending downward and outward or the curved surface is preferably 0.1% or more, more preferably 10% or more, still more preferably 20% or more, still more preferably 40% or more with respect to the thickness of the thin glass. In one embodiment, the upper limit of $H_1$ is 100%. In another embodiment, $H_1$ is preferably less than 100%, more preferably 59.9% or less, still more preferably 90% or less, still more preferably 80% or less. When $H_1$ falls within such ranges, a thin glass laminate that is less liable to be broken can be obtained. The "height $H_1$ of a portion in which the end surface is formed of the inclined surface extending downward and outward or the curved surface" means a total height of the inclined surface extending downward and outward and the curved surface. A portion other than the portion in which the end surface is formed of the inclined surface extending downward and outward or the curved surface may be a portion in which the end surface is formed of the vertical surface.

A ratio ($H_1$:$H_2$) between the height $H_1$ of the portion in which the end surface is formed of the inclined surface extending downward and outward or the curved surface and a height $H_2$ of the portion in which the end surface is formed of the vertical surface (that is, a height obtained by subtracting $H_1$ from the thickness of the thin glass) is preferably from 1:9 to 10:0, more preferably from 1:9 to 9.99:0.01, more preferably from 2:8 to 9:1, still more preferably from 4:6 to 6:4. When the ratio falls within such ranges, a thin glass laminate that is less liable to be broken can be obtained.

The curved surface has a radius of curvature of preferably from 50 μm to 1,500 μm, more preferably from 50 μm to 1,000 μm. When the radius of curvature falls within such ranges, a thin glass laminate that is less liable to be broken can be obtained. The curved surface may be uniquely determined or may be formed of a set of any appropriate curvatures.

A central angle α of a circular sector including a curve forming the curved surface (one curved surface) is preferably from 5° to 95°, more preferably from 10° to 90°, still more preferably from 30° to 90°. When the central angle α falls within such ranges, a thin glass laminate that is less liable to be broken can be obtained.

The thin glass has a thickness of preferably from 30 μm to 150 μm, most preferably from 50 μm to 100 μm. When the thickness falls within such ranges, a thin glass laminate excellent in flexibility can be obtained without impairing the physical properties (hardness, CTE, barrier properties, etc.) of the thin glass.

The thickness of the resin film may be set to any appropriate thickness depending on the application. The thickness of the resin film is, for example, from 10 μm to 500 μm, preferably from 30 μm to 200 μm.

The lower limit of a ratio between the thickness of the resin film and the thickness of the thin glass (thickness of the resin film/thickness of the thin glass) is preferably 0.2 or more. When the ratio falls within such range, scattering of the thin glass can be prevented. The upper limit of the ratio between the thickness of the resin film and the thickness of the thin glass (thickness of the resin film/thickness of the thin glass) is preferably 5 or less. When the ratio falls within such range, stress applied to a glass surface is allowable even when the thin glass is bent in a convex shape. The ratio between the thickness of the resin film and the thickness of the thin glass (thickness of the resin film/thickness of the thin glass) is more preferably from 0.3 to 3. When the ratio falls within such range, the thin glass can be prevented from being broken even in the case where the thin glass is cracked when the thin glass laminate is handled.

The thin glass laminate may include any appropriate other layer. For example, any appropriate other layer is arranged on a surface of the thin glass on an opposite side of the resin film. An example of such layer is a layer having a thickness of 100 µm or less, and a specific example thereof is a protective film that is temporarily arranged in order to prevent adhesion of foreign matter to the surface of the thin glass and contamination thereof. In addition, the glass surface may include a functional layer, such as a transparent electrode, an antireflection layer, or an antifouling layer. The thickness of the functional layer is preferably 1 µm or less.

In one embodiment, the thin glass laminate is formed without arranging the other layer on the surface of the thin glass on an opposite side of the resin film (that is, the thin glass laminate is formed through use of the thin glass as an outermost layer). In the thin glass laminate formed so that the thin glass is positioned as the outermost layer, the thin glass is liable to be broken, and particularly, the thin glass tends to be easily cracked when the thin glass laminate is bent so as to be convex on a thin glass side. However, in the thin glass laminate of the present invention, even when the thin glass is positioned as the outermost layer, the thin glass laminate is excellent in bending durability.

B. Thin Glass

The shape of the thin glass is typically a sheet shape. According to classification based on a composition, examples of the thin glass include soda-lime glass, borate glass, aluminosilicate glass, and quartz glass. In addition, according to classification based on an alkali component, examples thereof include alkali-free glass and low-alkali glass. The content of an alkali metal component (e.g., $Na_2O$, $K_2O$, or $Li_2O$) in the thin glass is preferably 15 wt % or less, more preferably 10 wt % or less.

The thin glass preferably has a total light transmittance at a wavelength of 550 nm of 90% or more. The thin glass preferably has a refractive index $n_g$ at a wavelength of 550 nm of from 1.4 to 1.6.

The thin glass has an average thermal expansion coefficient of preferably from 10 ppm° $C.^{-1}$ to 0.5 ppm° $C.^{-1}$, more preferably from 7 ppm° $C.^{-1}$ to 0.5 ppm° $C.^{-1}$.

The thin glass has a density of preferably from 2.3 $g/cm^3$ to 3.0 $g/cm^3$, more preferably from 2.3 $g/cm^3$ to 2.7 $g/cm^3$.

The end surface of the thin glass has an arithmetic average surface roughness Ra of preferably 150 nm or less, more preferably 130 nm, still more preferably 110 nm or less. The lower limit of the arithmetic average surface roughness Ra of the end surface of the thin glass is, for example, 10 nm or more.

The end surface of the thin glass has a ten-point average roughness Rz of preferably 500 nm or less, more preferably 450 nm or less, still more preferably 400 nm or less. The lower limit of the ten-point average roughness Rz of the end surface of the thin glass is, for example, 200 nm or more.

As a method of forming the thin glass, any appropriate method may be adopted. Typically, the thin glass is produced by melting a mixture containing a main raw material, such as silica or alumina, an antifoaming agent, such as salt cake or antimony oxide, and a reducing agent, such as carbon, at a temperature of from 1,400° C. to 1,600° C. and forming the resultant into a thin sheet shape, followed by cooling. As a method of forming the thin glass into a thin sheet shape, there are given a slot down-draw method, a fusion method, and a float method. The thin glass formed into a sheet shape by any of those methods may be chemically abraded with a solvent, such as hydrofluoric acid, as required, in order to reduce the thickness and enhance the smoothness.

As the thin glass, a commercially available thin glass may be used as it is, or a commercially available thin glass may be used after being abraded to have a desired thickness. Examples of the commercially available thin glass include "7059", "1737" and "EAGLE2000" manufactured by Corning Incorporated, "AN100" manufactured by AGC Inc., "NA-35" manufactured by NH Techno Glass Co., Ltd., and "OA-10" manufactured by Nippon Electric Glass Co., Ltd., and "D263" and "AF45" manufactured by Schott AG.

C. Resin Film

In one embodiment, an optical film is used as the resin film. Examples of the optical film include a polarizing plate (optical film having a polarizing function), a retardation plate, and an isotropic film. The resin film may have a single-layer configuration or a multi-layer configuration.

Any appropriate material is used as a material for forming the resin film. Examples of the material for forming the resin film include a polyvinyl alcohol (PVA)-based resin, a polyolefin-based resin, a cyclic olefin-based resin, a polycarbonate-based resin, a cellulose-based resin, a polyester-based resin, a polyamide-based resin, a polyimide-based resin, a polyether-based resin, a polystyrene-based resin, a (meth)acrylic resin, a (meth)acrylic urethane-based resin, a polysulfone-based resin, an acetate-based resin, an epoxy-based resin, a silicone-based resin, a polyarylate-based resin, a polysulfone-based resin, a polyether imide-based resin, an epoxy-based resin, a urethane-based resin, and a silicone-based resin.

The resin film has a modulus of elasticity at 23° C. of preferably from 1.5 GPa to 10 GPa, more preferably from 1.8 GPa to 9 GPa, still more preferably from 1.8 GPa to 8 GPa. When the modulus of elasticity falls within such ranges, a high protective effect is exhibited on the thin glass, and a thin glass laminate that is less liable to be broken can be obtained. In the present invention, the modulus of elasticity may be measured through a tensile test.

In one embodiment, the resin film includes a transparent conductive layer. The resin film with a transparent conductive layer is formed by arranging a transparent conductive layer on the resin film. Examples of the transparent conductive layer include a metal oxide layer, a metal layer, a layer containing a conductive polymer, a layer containing metal nanowires, and a layer formed of a metal mesh.

D. Protective Film

In one embodiment, a protective film is arranged on an outer surface of the thin glass. The protective film is configured to temporarily protect the thin glass and prevent foreign matter or the like from adhering to the thin glass. Examples of the material for forming the protective film include polyethylene, polyvinyl chloride, polyethylene terephthalate, polyvinylidene chloride, polypropylene, polyvinyl alcohol, polyester, polycarbonate, polystyrene, polyacrylonitrile, an ethylene-vinyl acetate copolymer, an ethylene-vinyl alcohol copolymer, an ethylene-methacrylic acid copolymer, nylon, cellophane, and a silicone resin.

E. Method of Manufacturing Thin Glass Laminate

In one embodiment, the thin glass laminate may be obtained by laminating a thin glass and a resin film on each other to form a laminate A, cutting the laminate A into a predetermined size, and abrading an end portion (end surface) of a laminate B obtained by the cutting.

In one embodiment, the laminate A is formed by laminating the resin film and the thin glass on each other via an adhesive. Any appropriate adhesive is used as the adhesive. Examples of the adhesive include adhesives containing a resin having a cyclic ether group, such as an epoxy group, a glycidyl group, or an oxetanyl group, an acrylic resin, and a silicone-based resin. Of those, a UV-curable adhesive is preferably used.

In another embodiment, the laminate A may be formed by applying a resin solution onto the thin glass.

As a method of cutting the laminate A, any appropriate method may be adopted. Examples of the cutting method include methods involving cutting through use of, for example, a fullback, a UV laser, a water jet, and an end mill.

The end surface of the laminate B has a crack length of preferably from 10 μm to 300 μm, more preferably from 10 μm to 200 μm. The crack length means a maximum value of a length component of a crack in a direction perpendicular to the end surface when the laminate B is viewed from an upper surface.

As a method of abrading the end surface of the laminate B, polishing is preferably adopted. The polishing is a method involving pressing an abrasive cloth against the end surface of the laminate B to cause relative motion, and supplying a slurry containing free abrasive grains to a surface to be processed when the abrasive cloth is subjected to relative motion, to thereby abrade the end surface. In the present invention, through the polishing, the end surface having the inclined surface extending downward and outward and/or the curved surface as described above can be formed.

It is preferred that the abrasion treatment of the end surface of the laminate B be performed under a state in which the laminate B is interposed between other sheet glasses or resin plates. With this configuration, on the surface of the thin glass, the slurry penetrates an upper portion of the thin glass through pressing toy the abrasive cloth on a glass surface side, and the effect of the pressing toy the abrasive cloth can be reduced on a resin film side of the thin glass. Thus, the end surface having the inclined surface extending downward and outward and/or the curved surface as described above can be satisfactorily formed.

As the abrasive cloth to be used for polishing, a nylon brush is preferably used. The brush has a diameter of preferably from 0.1 mm to 0.5 mm, more preferably from 0.1 mm to 0.3 mm.

As the free abrasive grains, for example, cerium oxide, silicon oxide, indium oxide, or the like may be used. It is particularly preferred that cerium oxide be used because a silicon component of the glass and cerium also cause a substitution reaction so that the glass can be cut while being melted. The free abrasive grains each preferably have a grain diameter of from about 1 μm to about 5 μm.

The abrasion amount at the time of polishing is preferably 300 μm or less, more preferably 200 μm or less, still more preferably 100 μm or less. When a target abrasion amount is too large, there is a risk in that a thin glass laminate having a desired shape may not be obtained, and for example, there is a risk in that a defect, such as delamination between the resin layer and the glass by the nylon brush, may occur.

In the thin glass laminate obtained by polishing the laminate B, the arithmetic average roughness Ra of a glass portion is preferably 150 nm or less, more preferably 130 nm, still more preferably 110 nm or less. The lower limit of the arithmetic average roughness Ra of the glass portion is, for example, 10 nm or more. In addition, the ten-point average roughness Rz of the glass portion is preferably 500 nm or less, more preferably 450 nm or less, still more preferably 400 nm or less. The lower limit of the ten-point average roughness Rz of the glass portion is, for example, 200 nm or more.

EXAMPLES

The present invention is specifically described below by way of Examples, but the present invention is not limited to these Examples. Evaluation methods in Examples and Comparative Examples are as described below.

Production Example 1

Production of Thin Glass/Resin Film Laminate (Laminate A)

A resin film was laminated on a thin glass (manufactured by Nippon Electric Glass Co., Ltd., product name "OA-10") having a thickness of 100 μm via an adhesive (epoxy-based UV-curable adhesive, thickness: 10 μm), to thereby produce a thin glass/resin film laminate (laminate A). As the resin film, a film formed by laminating a polarizer having a thickness of 5 μm and an acrylic film having a thickness of 40 μm on each other was used. In addition, the resin film was laminated so that the acrylic film was opposed to the thin glass.

Example 1

The laminate A was cut with a dicing device (manufactured by Shoda Techtron Corp., product name "CCM-550A type") to obtain a laminate B. The cutting conditions were such that the sample was cut (size: 60 mm×120 mm) at a rotation number of 3,000 rpm and a speed of 40 mm/min through use of a wheel of diamond abrasive grains of #325 each having a diameter of 200 mm under a state in which both end portions of the sample were fixed.

Next, 15 laminates B were laminated. The resultant laminate was sandwiched, at upper and lower sides thereof, between sheet glasses (60 mm×120 mm) each having a thickness of 500 μm, and four sides of a peripheral portion were subjected to end surface treatment through use of a polishing device (manufactured by Shoda Techtron Corp., product name "BPM-330C") to obtain a thin glass laminate.

In the end surface treatment, while a 6-inch diameter roll made of a nylon brush having a diameter of 0.2 mm was rotated (rotation speed: 900 rpm, brush application amount: 5 mm), and an abrasion liquid was supplied, the end surface was abraded with the nylon brush. As the abrasion liquid, an abrasion liquid containing particles (particle diameter: from 2 μm to 3 μm) of cerium oxide in water was used. The final abrasion amount was set to 100 μm.

Example 2

A surface protective film (manufactured by Nitto Denko Corporation, RP207) was bonded to the surface of the thin glass of the laminate A, and then the resultant was cut and subjected to polishing treatment in the same manner as in Example 1 to obtain a thin glass laminate.

Comparative Example 1

The laminate A was cut with a UV laser (wavelength: 355 nm, pulse width: 15 ps, speed: 1,000 mm/s, scan number: 100 times) to obtain a thin glass laminate.

Comparative Example 2

After the laminate A was roughly cut with a cutting machine, 15 laminates A were laminated, and the resultant was subjected to end surface treatment with a rotary cutting blade (manufactured by Misumi Group Inc., XAL series carbide square end mill, 2 blades/blade length 3D type) to obtain a thin glass laminate. The cutting conditions were such that the treatment was performed at a cutting amount of 0.5 mm, a rotation number of 25,000 rpm, and a speed of 1,500 mm/s.

Comparative Example 3

The laminate A was cut with a dicing device (manufactured by Shoda Techtron Corp., CCM-550A type) to obtain a thin glass laminate. The cutting conditions were such that the sample was cut at a rotation number of 3,000 rpm and a speed of 40 mm/min through use of a wheel of diamond abrasive grains of #325 each having a diameter of 200 mm under a state in which both end portions of the sample were fixed.

[Evaluation]

The thin glass laminates obtained in Examples and Comparative Examples (in Example 2, the thin glass laminate after the protective film was peeled off) were subjected to the following evaluations. The results are shown in Table 1.

(1) Shape Evaluation

The cross-section of the thin glass laminate was observed by SEM, and an end surface shape (presence or absence of the curved surface formed on the thin glass; curvature of the curved surface; angle $\theta_2$ formed by the tangent plane A given at a position having a height of (height h1 of the curved surface)×¾ on the curved surface and the upper surface of the thin glass) was measured. In each of the thin glass laminates of Comparative Examples 1 to 3, the curved surface was not formed on the end surface of the thin glass, and the angle formed by the upper surface and the vertical surface was 90°.

In addition, the arithmetic average surface roughness Ra and the ten-point average roughness Rz of the end surface of the thin glass were measured by AFM (field of view: 50 μm square).

(2) Bending Strength

The thin glass laminate (size: 60 mm×110 mm) was subjected to a two-point bending test by bending long sides, and the distance between two points when cracking occurred was measured. The distance between two points means the distance between one end and the other end in a long side direction, which becomes shorter along with bending when the thin glass laminate is bent with a center portion in a length direction being a starting point. In addition, a smaller distance between two points means higher bending strength.

TABLE 1

| | Presence or absence of curved surface | Curvature (μm) | $\theta_2$ (°) | Ra (nm) | Rz (nm) | Bending strength (mm) |
|---|---|---|---|---|---|---|
| Example 1 | Present | 130 | 132 | 90 | 380 | 30 |
| Example 2 | Present | 1,164 | 93 | 104 | 399 | 35 |
| Comparative Example 1 | Absent | — | — | 226 | 1,088 | 90 |
| Example 2 | Absent | — | — | 1,447 | 4,643 | 80 |
| Comparative Example 3 | Absent | — | — | 245.7 | 1,396 | 85 |

As is apparent from Table 1, when a predetermined curved surface is formed on the end surface of the thin glass, a thin glass laminate excellent in bending durability can be obtained.

REFERENCE SIGNS LIST

10 resin film
20 thin glass
100 thin glass laminate

The invention claimed is:

1. A thin glass laminate, comprising:
a resin film; and
a thin glass arranged at least on the resin film,
wherein the resin film is an optical film,
wherein the thin glass has a thickness of from 30 μm to 150 μm,
wherein at least part of an end surface of the thin glass is formed of an inclined surface extending downward and outward and/or a curved surface, and
wherein the thin glass has an upward curved surface and a downward curved surface on at least part of the end surface of the thin glass and an angle $\theta_3$ formed by a tangent plane given at a position having a height of h1'×¼ based on a lower end side of the downward curved surface and a lower surface of the thin glass is more than 90° and 150° or less, wherein the downward curved of the thin glass is brought into contact with the resin film.

2. The thin glass laminate according to claim 1, wherein, at an upper end of the thin glass, at least part of the end surface is formed of the inclined surface extending downward and outward or the curved surface.

3. The thin glass laminate according to claim 1, wherein at least part of the end surface of the thin glass is formed of the inclined surface extending downward and outward, and
wherein an angle $\theta_1$ formed by an upper surface of the thin glass and the inclined surface extending downward and outward is more than 90° and 140° or less.

4. The thin glass laminate according to claim 1, wherein the thin glass has, as the curved surface, an upward curved surface that is convex outward on at least part of the end surface, and
wherein the upward curved surface is a curved surface in which an angle $\theta_2$ formed by a tangent plane A given at a position having a height of (height h1 of the curved surface)×¾ on the curved surface and an upper surface of the thin glass is more than 90°.

5. The thin glass laminate according to claim 4, wherein the angle $\theta_2$ is more than 90° and 140° or less.

6. The thin glass laminate according to claim 1, wherein at least part of the end surface of the thin glass is formed of the inclined surface extending downward and outward and/or the curved surface and a vertical surface.

7. The thin glass laminate according to claim 1, wherein, in the thin glass, a height H1 of a portion in which the end surface is formed of the inclined surface extending downward and outward or the curved surface is 0.1% or more with respect to a thickness of the thin glass.

8. The thin glass laminate according to claim 6, wherein a ratio (H1:H2) between a height H1 of a portion in which the end surface is formed of the inclined surface extending downward and outward or the curved surface and a height H2 of a portion in which the end surface is formed of the vertical surface is from 1:9 to 9.99:0.01.

9. The thin glass laminate according to claim 1, wherein the end surface of the thin glass has an arithmetic average surface roughness Ra of 150 nm or less.

10. The thin glass laminate according to claim 1, wherein the end surface of the thin glass has a ten-point average roughness Rz of 500 nm or less.

11. The thin glass laminate according to claim 1, wherein the resin film is arranged so as to protrude from the thin glass.

12. The thin glass laminate according to claim 1, wherein a step formed between the resin film and the thin glass in sectional view is 200 µm or less.

13. The thin glass laminate according to claim 1, wherein the optical film is a polarizing plate.

14. The thin glass laminate according to claim 1, wherein the resin film has a transparent conductive layer.

15. The thin glass laminate according to claim 1, wherein the thin glass and the resin film are laminated on each other via an adhesive.

16. A method of manufacturing the thin glass laminate of claim 1, comprising:
    laminating a thin glass and a resin film on each other to form a laminate A;
    cutting the laminate A to a predetermined size; and
    abrading an end surface of a laminate B obtained by the cutting through polishing.

* * * * *